United States Patent [19]
Lange et al.

[11] 3,896,419
[45] July 22, 1975

[54] CACHE MEMORY STORE IN A PROCESSOR OF A DATA PROCESSING SYSTEM

[75] Inventors: Ronald E. Lange; Matthew A. Diethelm, both of Phoenix; Phillip C. Ishmael, Tempe, all of Ariz.

[73] Assignee: Honeywell Information Systems Inc., Phoenix, Ariz.

[22] Filed: Jan. 17, 1974

[21] Appl. No.: 434,178

[52] U.S. Cl. .............................................. 340/172.5
[51] Int. Cl.² .......................................... G06F 13/06
[58] Field of Search .................................. 340/172.5

[56] References Cited

UNITED STATES PATENTS

| | | | |
|---|---|---|---|
| 3,525,081 | 8/1970 | Flemming et al. | 340/172.5 |
| 3,569,938 | 3/1971 | Eden et al. | 340/172.5 |
| 3,588,829 | 6/1971 | Boland et al. | 340/172.5 |
| 3,588,839 | 6/1971 | Belady et al. | 340/172.5 |
| 3,647,348 | 3/1972 | Smith et al. | 340/172.5 |
| 3,693,165 | 9/1972 | Reiley et al. | 340/172.5 |
| 3,699,533 | 10/1972 | Hunter | 364/172.5 |
| 3,705,388 | 12/1972 | Nishimoto | 340/172.5 |
| 3,761,881 | 9/1973 | Anderson et al. | 340/172.5 |
| 3,806,888 | 4/1974 | Brickman et al. | 340/172.5 |
| 3,848,234 | 11/1974 | MacDonald | 340/172.5 |

*Primary Examiner*—Raulfe B. Zache
*Assistant Examiner*—Jan E. Rhoads
*Attorney, Agent, or Firm*—Henry K. Woodward; Edward W. Hughes

[57] ABSTRACT

A cache store located in the processor provides a fast access look-aside store to blocks of data information previously fetched from the main memory store. The request to the cache store is operated in parallel to the request for data information from the main memory store. A successful retrieval from the cache store aborts the retrieval from a main memory. Block loading of the cache store is performed autonomously from the processor operations. The cache store is cleared on cycles such as interrupts which require the processor to shift program execution. The store-aside configuration of the processor overlooks the backing store cycle on a store operand cycle and the cache store checking operations are performed next causing the cycles to be performed simultaneously.

7 Claims, 4 Drawing Figures

CACHE MEMORY STORE IN A PROCESSOR OF A DATA PROCESSING SYSTEM

BACKGROUND OF THE INVENTION

This invention relates to electronic digital data processing systems and in particular to processors which incorporate a cache memory store.

FIELD OF THE INVENTION

A desirable, if not necessary, feature of a data processing system is a very large memory which may be directly addressed by either the operating system or the user application program, or both. Current computer scientists consider this a fundamental subsystem in the implementation of a marketable virtual machine. The cost of a very large (upwards from 4 million bytes) memory which will reliably operate at a speed commensurate with the central processor speed is prohibitive. The technological question of reliable uni-level memory operation at central processor speed for random access of a block in such a large address space has also not been satisfactorily answered. One approach to providing the necessary speed of operation, large storage and reasonable cost is a hierarchical main memory structure. The main memory store is composed of two parts, a relatively small, high speed memory store called a cache store, and a large slower backing memory store, generally magnetic core type.

The operating speed of the main memory hierarchy and processor is dependent upon the effectiveness of the scheme used to map memory references between the cache store and the backing memory. Further the effectiveness of the cache store depends upon its own retrieval characteristics as well as the interface characteristics between the processor and its cache store.

DESCRIPTION OF THE PRIOR ART

A common cache store uses a set associative mapping technique. An effective cache design must ensure that there is an adequate transfer rate between the backing store and the cache or buffer store. Previous cache stores were used mainly as a buffer store placed intermediate the processor and the backing store (main store). The choice then was to either propagate all data store instructions to both the backing store and the cache store, known as through-storing, or storing complete blocks of data that have been modified only when they are displaced from the cache store, known as post-storing. The choice involved a tradeoff of increased traffic between the cache and backing stores versus an added time penalty for block replacement. Post-storing complicates the control circuitry design because, since the backing memory does not contain the modified data, other paths to the backing memory must be prevented from accessing data which might not be current. Through-storing requires extra time since all data slated for storing in backing store must be processed through the cache store.

Accordingly, it is an object of the present invention to provide a cache store processor which uses a store-aside algorithm to update the data presently stored in the cache store and the backing memory store.

Further former cache store designs required the completion of block loads of data into the cache store from the backing store before releasing the processor to continue. Block loads of data into the cache store are more efficient than transferring and loading only the specific data word requested by the processor. A block of data generally comprises several words of data. However, several memory cycles are required to accomplish the transfer. The processor could continue operations if the completion of the block load operation was invisible to the processor.

Accordingly, it is an object of the present invention to provide a processor oriented cache store which performs block loads of data autonomously from the processor operations.

SUMMARY OF THE INVENTION

A computer system is provided in which the absolute address preparation is performed with the high order portion of an effective data address and a base register in the usual manner. In parallel, a set of address tags are read from a cache directory memory, in accordance with the low order address portion, which identify a corresponding set of data words in the cache store. The cache directory, the cache store, and the control logic therefor are made a part of the central processor. Accordingly, by the time the absolute address is available, both the comparison between the tags and the high order address portion of the data address and the subsequent read-out from the cache store can be completed. Also, the comparison is completed before the regular main memory ready cycle is started so that for those cases in which the data is not resident in cache memory, there is no delay in the overall data fetch cycle.

System efficiency is enhanced by providing a queue of main memory operations whereby when a store operand and store control information is placed in the queue, the system is immediately freed to continue processing data in accordance with the contents of the cache memory. This queue, together with its control logic, also provides essentially autonomous block loading of the cache memory.

The cache store speed and bandwidth are designed to match the processor characteristics, and the cache store size and logical organization are designed to achieve a smooth flow of instructions and data between the processor and the main memory structure. System integration of the processor, cache and backing memory is such that the cache store is not visible to any user but the whole backing memory and electromechanical extensions are available as a virtual memory.

It is, therefor, an object of the present invention to provide a cache store that is processor oriented rather than oriented to the backing store.

It is another object of the present invention to provide a processor having a cache store operating autonomously from processor operations.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of an illustrated embodiment when read in conjunction with the accompanying drawing, wherein.

DESCRIPTION OF THE PREFERRED EMBODIMENT

Figure 1:
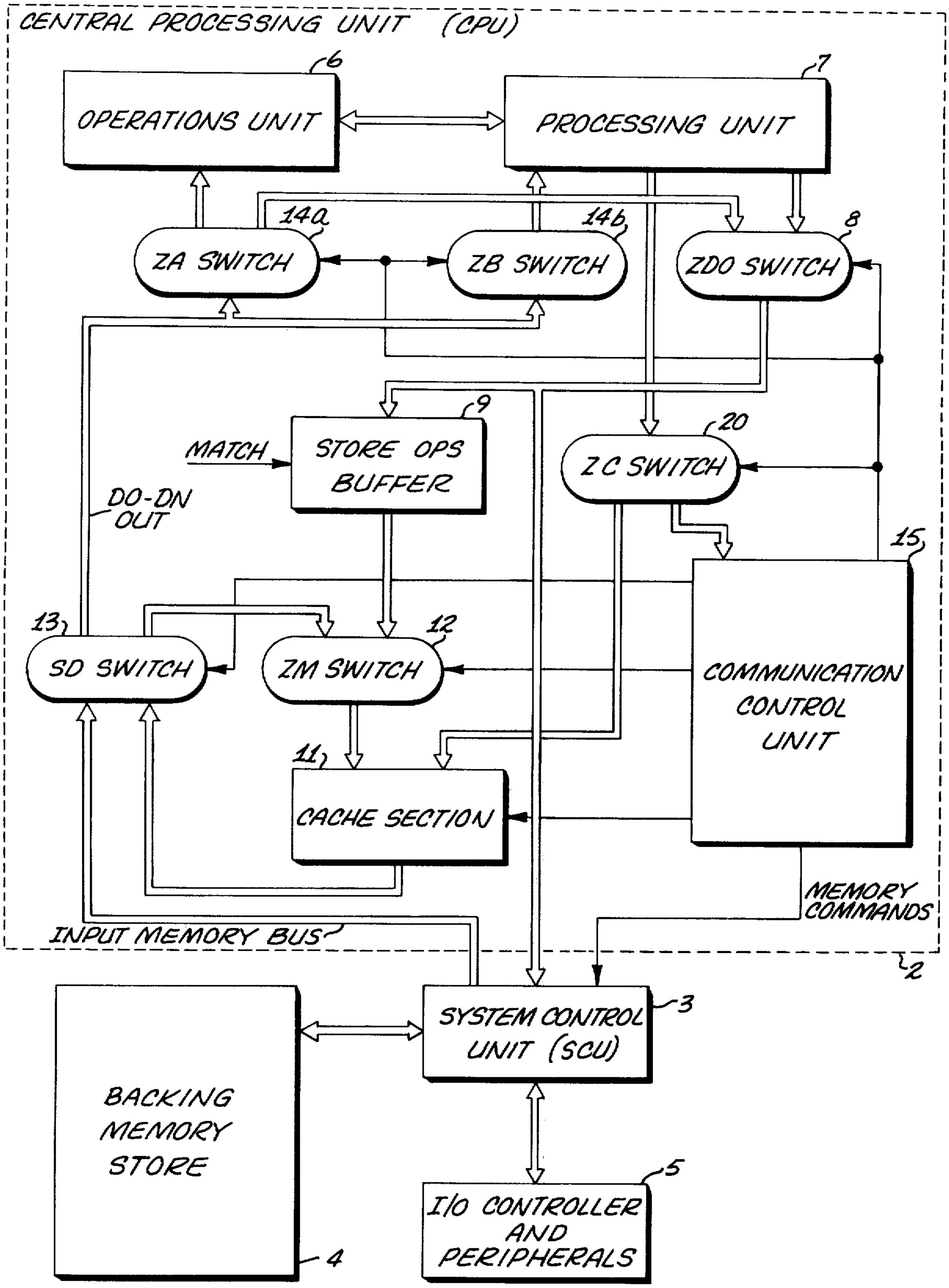
FIG. 1 is a block diagram of a data processing system including a cache store in a central processing unit.

A representative data processing system configuration is shown in FIG. 1. The data processing system shown includes a central processing unit (CPU) 2, a system control unit (SCU) 3, and a backing memory store 4. Communication with a set of peripherals is controlled through a block 5 labeled I/O controller and peripherals. The system control unit 3 controls the communication among the units of the data processing system. Thus the peripherals communicate with the backup memory store 4 and the central processing unit 2 via the I/O controller controlling access to individual peripherals and the system control unit controls access to the backup memory store 4 and the central processing unit 2.

The central processing unit 2 includes an operations unit 6 performing arithmetic and logic functions on operands fetched from a memory store in accordance with instructions also fetched from the memory store. A processing unit 7 represents the further logic controls and operations performed by the central processing unit. The central processing unit 2 according to the present invention includes as part of its memory store a cache store with associated control logic shown as a cache section 11. Various data bus switches perform the data interface functions of the central processing unit 2 and include a ZDO switch 8, a ZM switch 12, a SD switch 13, a ZA switch 14*a* and a ZB switch 14*b*. The control of the interface functions of the central processing unit 2, including preparation of absolute data addresses, are performed by a communication control unit 15. A store operands buffer 9 provides an intermediate register storage between the processing unit 7 and the cache section 11.

The dual lines shown in FIG. 1 show the path taken by the data information while the control lines controlling the communications is shown via a single solid line.

The SD switch 13 controls the entry of data into the processor 2 over the input memory bus. The data is switched into either the operations unit 6 by activating the ZA switch 14*a*, the processing unit 7 by activatiing the ZB switch 14*b*, or the cache section 11 by activating the ZM switch 12 or any combination of data bus switches and by placing the cache section 11 within the processor itself, the processor 2 signals the SCU3 to transfer a block of words (four in the present embodiment) into the cache section while transferring one word to the operations unit 6. One word will be transferred via the input memory bus and the SD switch 13 and via the ZA switch 14*a* into the operations unit 6. At this time the ZM switch 12 is also activated to store the word into the cache section 11. The operations unit 6 works on the data word with the ZA switch 14*a* closed. The SD switch 13 and the ZM switch 12 remain open to accept the remaining words of the block into the cache section. The operations unit 6 and/or the processing unit 7 need not be made aware of the block transfer except for the initial memory retrieval signal stored by the communication control unit 15. If required, the remaining words from the block of words are retrieved from the cache section 11.

As will be discussed in more detail later, if the data information required by the processor is already in the cache section 11, the SD switch 13 is activated and the ZM switch 12 is closed to transfer data from the cache section 11 directly without disturbing the backing memory store 4.

On a write-to-memory operation, the ZDO switch 8 is activated along with possibly other switches such as the ZA switch 14*a* to transfer data from the processor 2 to the SCU3 and then to the backing store 4. Using the store-aside feature of the present invention, if the data to be written into the backing sotre 4 is already present in the cache section 11, the data must be updated in the cache section 11 as well as the backing store 4. The data is transmitted to the backing store 4 and into the store ops buffer 9 at the same time. The data is then transferred to the cache section 11 by activating the ZM switch 12. The processor does not wait for a memory cycle completion signal from the backing store 4 but instead continues processing data, provided the data needed is already in the cache section 11.

The check of the completion of the transfer of the data to the backing store 4 is performed off-line. A correct completion is not a requirement to continue processing data since an error in the transfer stops operations anyway. Since most transfers do not result in an error, the several instructions completed gain an extra advantage over even that gained by the use of a cache store. The cache section 11 forces a completion signal when the data reaches the cache section. The processor starts the next cycle and, if the data needed is already in the cache section, that instruction as well as others will be completed. If the instruction is not in the cache section 11, the data must be obtained from the backing store 4 and the processor waits the completion of the memory store write cycle before requesting further data. This is the normal cycle without a cache section and thus no further delays are required.

An advantage of the store-aside algorithm is further seen using a block load instruction retrieving data from the backing store. Two processor cycles are required. The memory command signals are generated and the data is transmitted from the backing store 4 through the SCU3 and through the SD switch 13 to either the operations unit 6 or the processing unit 7 and through the ZM switch 12 to the cache section 11. If the next instruction required by the processing unit 7 is a store or write to memory instruction, it can be processed holding the data to be written into the cache store in the store ops buffer 9 while the block load is being completed to the cache section 11. The processor unit 7 is freed to continue processing as soon as the data is transferred to the SCU3 using the rest of the data from the block of words now stored in the cache section 11.

The cache store of the cache section 11 is a "look-aside memory" or high-speed buffer store. The cache store provides a fast access to blocks of data previously retrieved from the backup memory store 4 and possibly updated later. The effective access time in the cache store is obtained by operating the cache store in parallel to existing processor functions. Successful usage of the cache store requires that a high ratio of storage fetches for data information be made from the cache store rather than requiring that the processor access the backup memory store directly. In any event, the search of the cache store for the possible quick retrieval of the data information should not delay the retrieval from the backup memory store. The system according to the preferred embodiment checks the cache store while the generation of a potential retrieval from the backup memory store is being processed. If the data information is found in the cache store, the retrieval from the backup memory store is blocked. The operations unit 6 and the processing unit 7 obtain the data information from the cache section 11 via the SD switch 13 in a much shorter period of time without the unit being aware of the source. For a more complete description of the cache section communicating control reference is made to a copending U.S. Pat. application, Ser. No. 393,358, filed on Aug. 31, 1973 and assigned to the same assignee as the present invention. A block diagram of the cache section 11 including the cache store 10 and portions of the communication control unit 15 is shown in FIG. 2.

Figure 2:
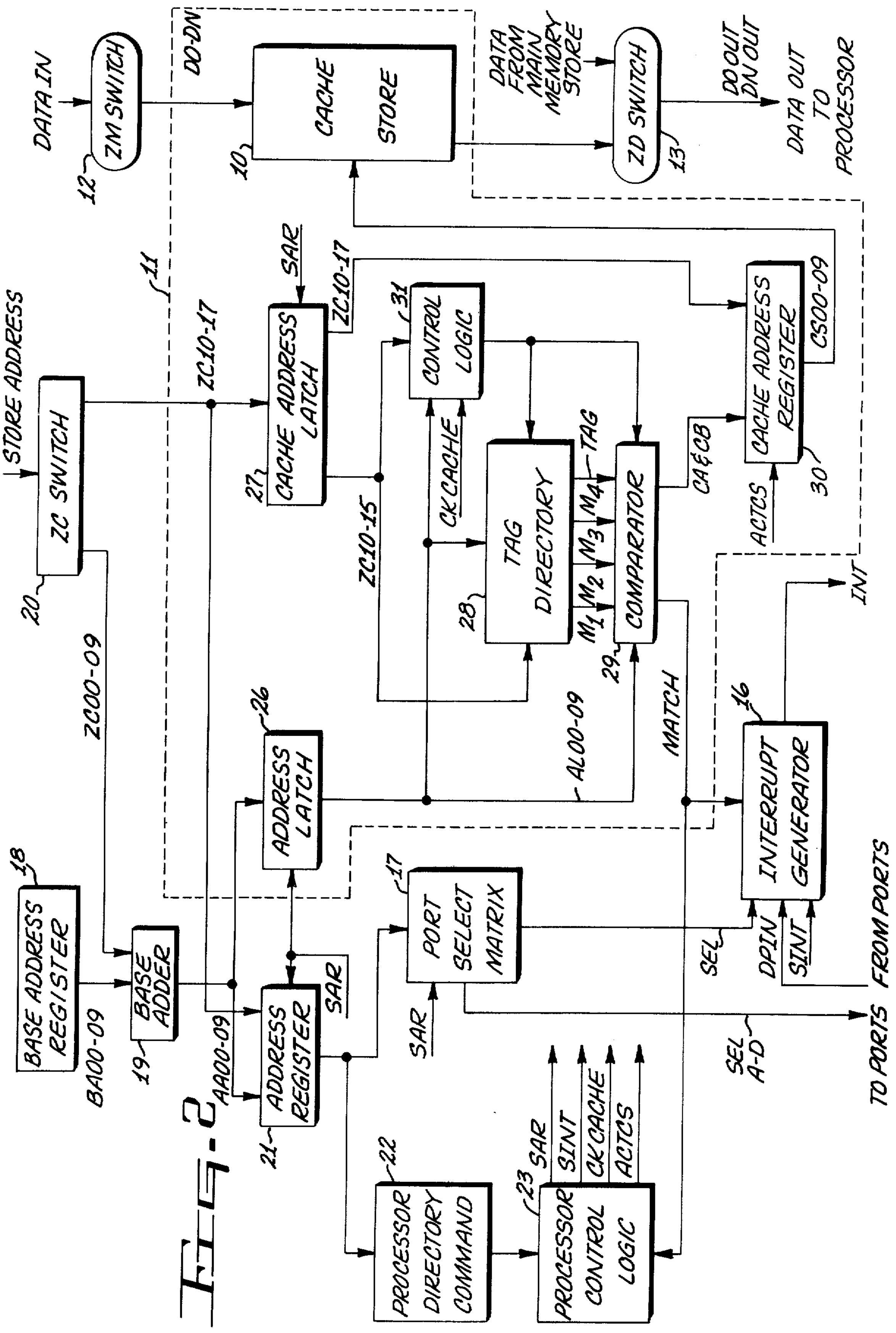
FIG. 2 is a block diagram of a communications control apparatus and a cache section of the central processing unit shown in FIG. 1.

Referring now to FIG. 2, the standard data processing communication control section 15 includes an interrupt generator circuit 16, a port select matrix circuit 17, a base address register 18, a base address adder 19, an address register 21, and a processor directory command 22 and a processor control logic 23 blocks representing the control logic of the processor. A ZC switch 20 controls the input of the store address for retrieval of the data information from the main memory store, either the cache store 10 or the backing memory store 4. The store address is obtained from the processing unit to retrieve the data information according to the address signals. The cache section 11, besides the cache store 10, includes an address latch register 26, a cache address latch register 27, a tag directory 28, a comparator 29, a cache address register 30, and associated counters and control logic shown as block 31.

Figure 4:
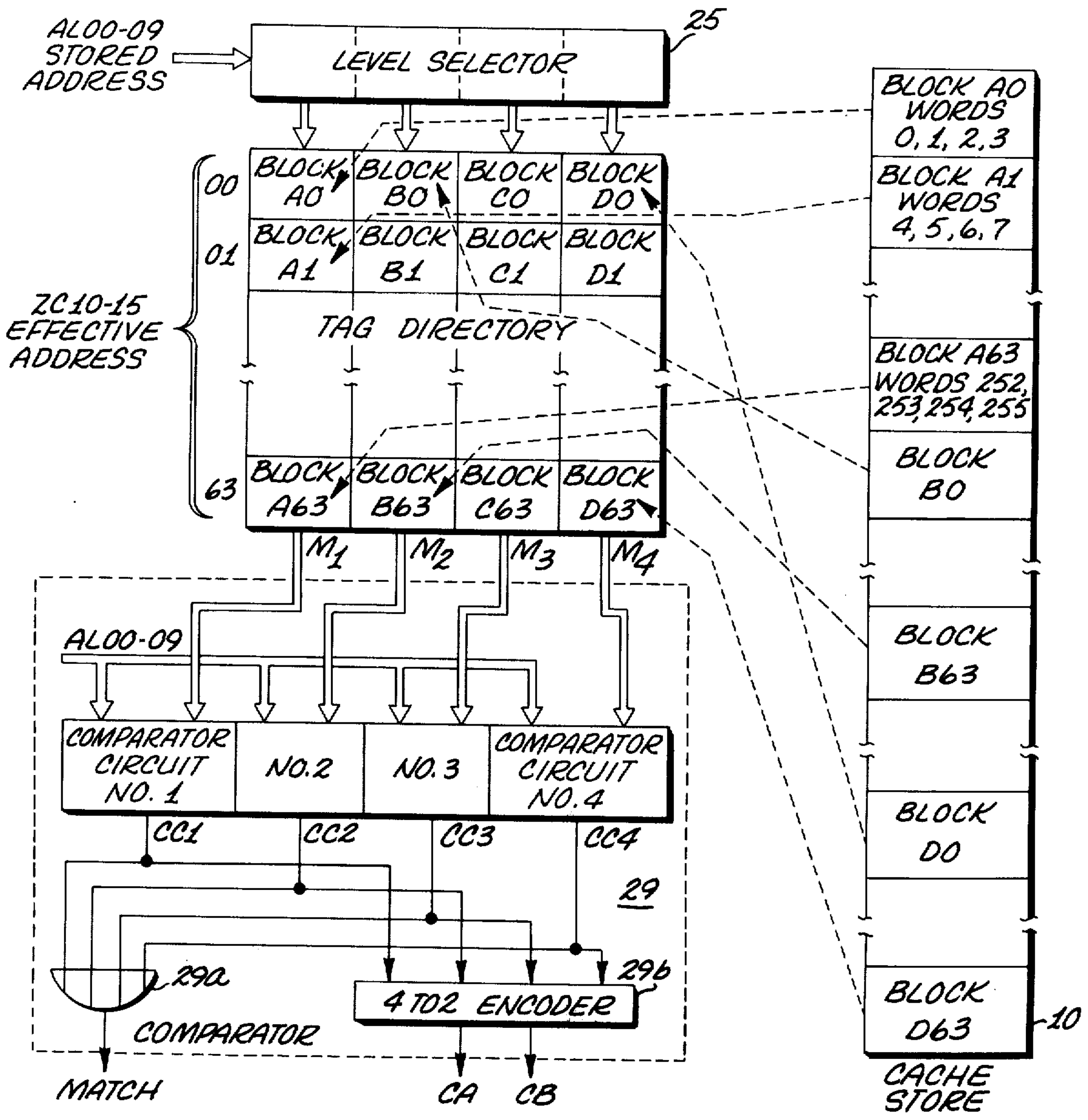
FIG. 4 is a block diagram of a tag directory with a comparator and shows the mapping strategy between the cache store and its tag directory shown in FIG. 2.

The cache or tag directory 28 identifies the storage section or block in the cache store 10. "TAG" words are stored in the tag directory 28 to reflect the absolute address of each data block. The mapping of the tag directory 28 according to the preferred embodiment is called a four level set associative mapping. The mapping organization is shown in FIG. 4. The tag directory is divided into N columns, 64 for example, to correspond to the number of blocks in the cache store. Each column has 4 levels. A 1K cache store is thus divided into 64 four-word blocks. Each block maps directly into a corresponding column of the directory. Each column of the tag directory contains addresses of four blocks, each from a different section. The replacement procedure for loading new blocks into a column which is full is on a first in, first out basis and is called round robin organization (RRO).

The tag directory 28 is implemented as a small memory with the number of locations equal to the number of blocks in the cache store. The columns of the tag directory 28 are addressed and located by the effective address signals ZC10-15. EAch column has four levels in which the stored address signals AL00-09 are stored pointing to a particular block in the cache store 10. In order to locate the particular level of the tag directory and the particular location of the data information in the cache store, the round robin circuit is needed. The placement of high order stored address signals AL00-09 into the levels of the tag directory 28 is controlled by a level selector 25. The level selector 25 places the AL00-09 signal into the tag director 28 according to the round robin circuit. A round robin placement circuit for use with the present invention is disclosed in a copending U.S. Pat. application, Ser. No. 401,467, filed on Sept. 27, 1973 and assigned to the same assignee as the present invention.

The cache store 10 of the preferred embodiment stores 1024 data bits DO-DN in each chip section with each word length having 36 bits of information in each half of memory store, 72 bits of information in the combined sections. The cache store 10 has four levels accessed by the CA and CB address signals from the comparator 29. The readout data information signals DOOUT-DNOUT are common to all four levels.

Figure 3:
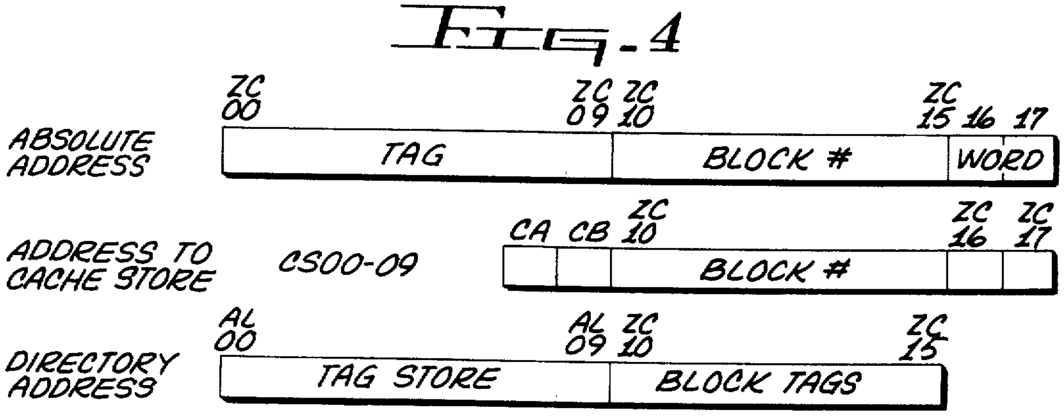
FIG. 3 is a diagram illustrating the addressing scheme used by the cache section shown in FIG. 2.

The cache store 10 is addressed by the cache address signals CS00-09 made up of the low order address signals ZC10-17 together with the CA and CB signal, see FIGS. 2 and 3. The ZC16 and ZC17 signals signify whether the word addressed is in the upper or lower half of the memory block or whether a double word, both halves, is to be accessed at the same time.

The DO-DN data signals are the DATA IN signals, see FIG. 1. entered by the ZM switch 12, and the DOOUT-DNOUT signals are the DATA OUT signals transmitted to the main registers of the processor by the ZD switch 13.

Referring now to FIGS. 2 and 4, the data information stored in the tag directory 28 is the main memory address of the data stored in the cache store 10. Only ten address bits are shown stored in the tag directory 28, the AL00-09 address bits from the address latch register 26. Thus by addressing the column of the tag directory 28 by the effective address ZC10-15 signals, the block word information stored in the cache store 10 is obtained. The address information stored in the addressed column is compared in the comparator 29 to the main memory store address AL00-09 signals being requested by the processor.

The comparator 29 essentially comprises four groups of a plurality of comparing circuits, ten in the present embodiment, which compares the ten address signals from each of the four levels of the tag directory 28, the M1, M2, M3 and M4 signals, to the ten address signals AL00-09. If a comparision is made by all the signals in any ten signal comparator circuit either No. 1, 2, 3 or 4, and provided the level contained valid data, the comparator 29 generates a MATCH signal from an OR-gate 29*a* to inhibit interrupt generator 16 from generating an interrupt INT signal. The retrieval of data information will then be from the cache store 10 rather than from the main memory store.

The cache storage address signals CS00-09, see FIGS. 2 and 3, are developed from the comparator logic and the effective address and are stored in the cache address register 30. The ten bit address provides access to a 1024 word cache storage. The ten bit address uses address signals CA and CB from the comparator 29, developed from the comparison bits CC1-4 from the tag directory 28 and bits ZC10-17 from the effective address.

The address signals CA and CB are used to address the required level or chip select from one of the four words in the block of words in the cache store 10. The type of operation performed by the cache store 10 is controlled by activating the ZM switch 12 and/or the ZD switch 13. A cache read operation is performed when a compare is signaled by the comparator 29 on a data fetch or read memory instruction. A data fetch instruction on which no comparison occurs will generate a block load command to load new data into the cache store 10. A write memory instruction will instigate a check of the cache store and, if a compare is indicated, the data information is written into the cache store according to the store address as well as into the backing store. This store-aside policy for the cache store updates the data presently in the cache store without requiring a second memory cycle. The usual processor cycles and fault and interrupt cycles do not affect the cache section 11 and cause the processor directory command 22 to operate in a manner as if the cache store 10 did not exist.

Referring again to FIG. 2, the cache section 11 is controlled by an extension of the port control functions of the processor. The controls of the cache store 10 operate in synchronism with the port control. The interrupt generator 16 controls the tag directory 28 and the search of the tag directory 28 via the processor control logic 23. The cache store 10 is under the control of the directory command 22 of the processor. The directory command 22 along with the port select matrix 17 generates the instruction or patterns of signals required to control the operation of the processor ports.

Referring now to FIG. 2, the processor communication cycle starts with the enabling of the ZC switch 20 to enter the store address signals into the communications control unit and to load the base address into the base address register 18. Shortly thereafter the check cache store CK CACHE signal is activated if the processor cache store is to be used on this cycle. All cache and processor cycles start with the generation of a strobe address register SAR signal. At this time the effective address bits ZC10-15 are stable and enable an immediate access to the tag directory 28. The SAR signal loads the cache address latch register 27, the address latch register 26, and the address register 21 via the ZC switch 20. Additionally, the SAR will store and hold or latch the effective address bits ZC10-ZC17 and the output bits AA00-09 from the base adder 19 into the address register 21 and the address latch 26. Both addresses are saved in the event a block load cycle is required.

The time between the SAR signal and the strobe interrupt SINT signal is the normal time for the selection of the port to be used for main memory communication. During the time that tag directory access is being accomplished by the effective address signals ZC10-15, the addition of base address bits BA00-09 from the base address register 18 to the high order effective address bits ZC00-09 from the ZC switch 20 is taking place in the base address adder 19. The store address ZC00-17 signals are generated by the processor to identify the data information required. The base address register 18 modifies the high order portion of the store address signals in the base adder 19 to identify the section of memory store containing the data information. The absolute address bits AA00-09 from the base adder 19 are stored in the address register 21 and the address latch register 26 and are available for a comparison in the comparator 29 at the same time tag words M1-M4 are available from the tag directory 28.

The address signals from the address register 21 are directed to the port selection matrix 17 which encodes the address signals to activate one of the ports of the central processing unit 2. The port selection matrix 17 generates one of the port select signals SEL A-D for activating a particular port upon the generation of the SAR signal. When the selected port is ready to transmit from the processor, the selected port generates the port ready DPIN signal. The DPIN signal is directed to the interrupt generator 16 to generate the interrupt signal INT. The INT signal activates the system controller unit 3 and the backing memory store 4 to obtain the required data information.

On a read memory store operation when a correct comparison is made in the comparator 29 signalling that the high order address signals are in the tag directory 28 pointing to data in the cache store 10, the MATCH signal is generated by the comparator 29. The MATCH signal is generated between the time the strobe address register signal SAR is generated and the time that an interrupt signal INT is to be generated by the interrupt generator 16. The MATCH signal inhibits the generation of the INT signal when the selected port transmits a DPIN ready signal and a strobe interrupt signal SINT is generated by the processor control logic 23. The comparison match indicates that a retrieval of data information from the backing memory store is not required because the data information is presently available in the cache store 10. The port cycle retrieving the data information from the backing memory store is cancelled, and the data from the cache store 10 is used.

On a write memory store operation when the cache store needs to be checked for a possible update operation, the MATCH signal does not inhibit the generation of the INT signal since a memory cycle is always required. The MATCH signal enables the storage of the data into the store ops buffer 9 for later transfer to the cache section 11.

The MATCH signal enables the processor control logic 23 to generate an activate cache store ACTCS signal which is directed to the cache address register 30. The cache address register 30 addresses the location in the cache store 10 determined by the address bits ZC10-17 and the address signal CA and CB generated by the comparator 29 as a result of the comparison of the absolute address signals and the tag signals. On the read memory operation, the switch 13 is then activated to allow the data information from the address storage location in the cache store 10 to be directed to its processor. On a write memory operation the ZM switch is enabled to transfer the data into the cache section 11.

If a noncomparison is indicated by the comparator 29 on a read memory operation, the MATCH is not generated and the interrupt generator 16 generates an INT signal. The INT signal accomplishes the communication connection between the main memory store and the processor generated interrupt by activating the system controller 3. The system controller 3, in a manner well known, addresses the main memory store 4 according to the address stored in the address register 21. The data information from the backing memory store 4 is then retrieved and directed simultaneously to the processor and to its cache store 10 via the SD switch 13. The data information is located in the cache store 10 and the address is placed in the tag directory 28 according to the selected level under a first in, first out organization, the first data block placed into the cache store 10 is displaced by the new information.

The MATCH signal is also not generated if a non-comparison is indicated by the comparator 29 on a write memory operation. The MATCH signal prevents storage of the data into the store ops buffer 9. The data in the cache section 11 need not be updated and thus the data is written into the backing memory store 4 only.

If a cache read cycle is signalled such as on a transfer operand command, the cache address signals CS00-09 are not stored in the cache address register 30 but will start a cache store access immediately. As soon as the internal SINT signal is generated, the processor control logic 23 will generate a signal signifying that the data is located in the processor port, for this instance in the cache store 10. The port cycle is then completed in a normal fashion transmitting the data information to the operations unit for processing. The cache address register 30 can be used as a flow through register to start access of the cache store 10 immediately or as a queuing register to store a plurality of cache addresses to perform a series of cache store accesses such as for a block load or for accessing the cache store 10 to transfer data information to the operations unit 6 or the processing unit 7 or operations after a write to backing memory store with further required data information already in the cache store 10.

On a block load of data into the port system, data information fetch request with no compare in the tag directory 28, two port cycles are required. The first SINT signal will be released to the main memory store and the processor directory command 22 will be loaded with the block load function requirement and the address signals of the cache store will be placed into the cache address register 30. The SINT signal is not sent to the control. This prevents further address generation to allow the initiation of a second cycle. A flag is set in the port to generate the second cycle. During the second cycle, the tag directory 28 is activated to a write mode and the tag address latched in the cache address latch 27 will be written into the tag directory 28. The column address in the tag directory 28 is selected by the effective address bits ZC10-15 and the level is selected by the RRO counter signals. The SINT signal is transmitted from the selected port and the remaining words of the block of data is written into the cache store 10 according to the address stored in the cache address register 30.

Operational cycles will now be described. Referring in particular to FIGS. 1 and 2, during backing store fetch cycles the data information is distributed from the backing memory store 4 through the system control unit 3 and into the input memory bus to the ZD switch 13. The ZD switch under control of the communication control unit distributes the data information to the operations unit 6 and the processing unit 7. At the same time, the ZM switch is enabled to allow storage into the cache store 10. On subsequent cycles of the central processing unit requiring stored data information, the cache store is checked at the same time that a fetch from the backup store 4 is being readied. If the data needed is already in the cache store as evidenced by the generation of a MATCH signal by the comparator 29, the fetch from the main store is aborted by inhibiting the generation of the interrupt INT signal. A cache read cycle is enabled by the processor control logic 23 generating an ACTCS signal to the cache address register 30. The ZM switch 12 is disabled and the ZD switch is enabled to transfer the data information addressed by the cache address CS00-09 signals from the cache store directly to the operations unit 6 and the processing unit 7.

During write to memory cycles, the address data is transferred from the processing unit 7 via the ZC switch 20 to the communication control unit 15 and the cache section 11. On a non comparison of the address data, the data information is transmitted via the ZDO switch 8 to the system control unit 3 only for storage into the backing memory store 4. On a comparison of the address data, the MATCH signals enables the transfer of the data information into the store ops buffer 9 also. The MATCH signal activates the processor control logic 23 to generate the ACTCS signal which in turn transfers the CS00-09 address signal from the cache address register to the cache store 10. The ZM switch 12 is activated by the communication control unit and the data revised by the processing unit is transferred from the store ops buffer 9 to the cache store 10 to update the information in the cache store 10. This store-aside apparatus causes the storage of the updated data into both the cache store 10 and backing store 4 sections of the main memory store. The cache store 10 need not be cleared on processor modified data since both the cache store and the backing store will contain the updated date.

Very high speed integrated circuit packages are used for implementation of the cache store 10 as well as the other store units, such as the tag directory 28. The cache store address, see FIG. 3, directs the addressing of the particular circuit package along with the particular word or part of word from each package. The particular addressing of the integrated circuit packages is well known in the art and will not be further explained here. The comparator 29, see FIG. 4, comprises four groups of standard comparing circuits Nos. 1, 2, 3 and 4, with each group of comparing circuits checking a set of ten address latch register signals AL00-09 with the ten address signals, M1 for instance, retrieved from the tag directory 28. The second set of ten address signals M2 are compared in the comparing circuit No. 2. A MATCH signal is generated by the OR-gate **29*a* if all signals of any group are correctly compared. The comparison signals are also directed to a 4 to 2 encoder circuit 29*b* to generate the CA and CB signals directed to the cache address register 30**.

Thus what has been discussed is an embodiment of a communications control system embodying the principles of the present invention. There will be immediately obvious to those skilled in the art many modifications of structure, arrangement, proportions, the elements, materials and components used in the practice of the invention. For instance, a 1K cache store is included in the explanation of the preferred embodiment. It is obvious that by increasing the addressing bit signals by one bit doubles the address capability of the address signals and the usable cache store size to 2K. The size of the cache store 10 should not be taken as a limiting factor. Also positive logic gates are shown in the present embodiment. It is obvious that it is within the skills of one versed in the art to substitute negative logic without departing from within this invention. The appended claims are, therefore, intended to cover and embrace any such modifications, within the limits only of the true spirit and scope of the invention.

We claim:

1. A processor in a data processing system including a backing memory store storing data and instructions in addressable storage locations, said processor comprising:

a. operation means for performing arithmetic and logic functions on data and instructions retrieved from the backing memory store;

b. processing means for processing data and instructions according to signals generated by said operation means and the data processing system;

c. a communication control unit for controlling interface functions between the units of the processor and between the processor and the backing memory store in accordance with instructions processed by said processing means;

d. a buffer register;

e. a cache section including a cache store and means for storing data and instructions into addressable locations in said cache store;

f. first switch means controlled by said communication control unit for controlling transfer of data information from said processing means to said buffer register and to said backing memory store;

g. second switch means controlled by said communication control unit for selectively controlling transfer of data information from said backing memory store or said cache section to a third switch means and to said operations unit and said processing unit; and h. said third switch means controlled by said communication control unit for selectively controlling transfer of data information from said second switch means or said buffer register for storage in said cache store of said cache section; said third switch means operable in a store aside configuration to transfer the data information stored in said buffer register into said cache store if the address of the data information is in said cache section.

2. A processor as described in claim 1 further including means in said communication control unit for activating said second and third switch means to transfer data information from said backing memory store to said cache store to store a group of data and instruction words into said cache store without requiring further address signals from said processing means.

3. A processor as described in claim 1 wherein said cache section further includes a cache address register for storing a plurality of address signals obtained from said processing means for accessing data and instructions from said cache store, said cache address register queuing cache address signals to perform a series of cache store accesses.

4. A processor in a data processor system including a backing memory store storing data and instructions in addressable storage locations, said processor comprising:

a. operation means for performing arithmetic and logic functions on data and instructions retrieved from the backing memory store;

b. processing means for processing data and instructions according to signals generated by said operation means and the data processing system;

c. a communication control unit for controlling interface functions between the units of the processor and between the processor and the backing memory store in accordance with instructions processed by said processing means;

d. a buffer register;

e. a cache section including a cache store and means for storing data and instructions into addressable locations in said cache store;

f. first switch means controlled by said communication control unit for controlling transfer of data information from said processing means to said buffer register and to said backing memory store;

g. second switch means controlled by said communication control unit for selectively controlling transfer of data information from said backing memory store or said cache section to a third switch means and to said operations unit and said processing unit;

h. said third switch means controlled by said communication control unit for selectively controlling transfer of data information from said second switch means or said buffer register for storage in said cache store of said cache section; and i. means in said communication control unit for activating said second and third switch means to transfer data information from said backing memory store in said cache store to store a group of data and instruction words into said cache store without requiring further address signals from said processing means.

5. A processor as described in claim 4 wherein said cache section further includes a cache address register for storing a plurality of address signals obtained from said processing means for accessing data and instructions from said cache store, said cache address register queuing cache address signals to perform a series of cache store accesses.

6. A processor in a data processing system including a backing memory store storing data and instructions in addressable storage locations, said processor comprising:

a. operations means for performing arithmetic and logic functions on data and instructions retrieved from the backing memory store;

b. processing means for processing data and instructions according to signals generated by said operation means and the data processing system;

c. a communication control unit for controlling interface functions between the units of the processor and between the processor and the backing memory store in accordance with instructions processed by said processing means;

d. a buffer register;

e. a cache section including a cache store, and means including a cache address register for storing data and instructions into addressable locations in said cache store, said cache address register storing a plurality of address signals obtained from said processing means for accessing data and instructions from said cache store and for queuing cache address signals to perform a series of cache store accesses;

f. first switch means controlled by said communication control unit for controlling transfer of data information from said processing means to said buffer register and to said backing memory store;

g. second switch means controlled by said communication control unit for selectively controlling transfer of data information from said backing memory store or said cache section to a third switch means and to said operations unit and said processing unit; and h. said third switch means controlled by said communication control unit for selectively controlling transfer of data information from said second switch means or said buffer register for storage in said cache store of said cache section.

7. A processor in a data processing system including a backing memory store storing data and instructions in addressable storage locations, said processor comprising:

a. operation means for performing arithmetic and logic functions on data and instructions retrieved from the backing memory store;

b. processing means for processing data and instructions according to signals generated by said operation means and the data processing system;

c. a communication control unit for controlling interface functions between the units of the processor and between the processor and the backing memory store in accordance with instructions processed by said processing means;

d. a buffer register;

e. a cache section including a cache store, and means including a cache address register for storing data and instructions into addressable locations in said cache store, said cache address register storing a plurality of address signals obtained from said processing means for accessing data and instructions from said cache store and for queuing cache address signals to perform a series of cache store accesses;

f. first switch means controlled by said communication control unit for controlling transfer of data information from said processing means to said buffer register and to said backing memory store;

g. second switch means controlled by said communication control unit for selectively controlling transfer of data information from said backing memory store or said cache section to a third switch means and to said operations unit and said processing unit;

h. said third switch means controlled by said communication control unit for selectively controlling transfer of data information from said second switch means or said buffer register for storage in said cache store of said cache section; said third switch means operable in a store aside configuration to transfer the data information stored in said buffer register into said cache store if the address of the data information is in said cache section;

i. means in said communication control unit for activating said second and third switch means to transfer data information from said backing memory store to said cache store to store a group of data and instruction words into said cache store without requiring further address signals from said processing means.

* * * * *